United States Patent [19]

Sairanen et al.

[11] Patent Number: 4,492,897

[45] Date of Patent: Jan. 8, 1985

[54] MEANS FOR LIMITING AND CONTROLLING THE CURRENT OF A DISCHARGE LAMP

[75] Inventors: Martti Sairanen, Espoo; Matti Virta, Helsinki, both of Finland

[73] Assignees: Hauenkalliontie 6 A 4, Espoo; Porientie 3 E 48, Helsinki, both of Finland

[21] Appl. No.: 420,010

[22] Filed: Sep. 20, 1982

[30] Foreign Application Priority Data

Oct. 21, 1981 [FI] Finland .................................. 813297
Jan. 12, 1982 [FI] Finland .................................. 820096

[51] Int. Cl.[3] .................................................. G02B 9/60

[52] U.S. Cl. ...................................... 315/219; 315/224

[58] Field of Search ................. 315/224, 225, DIG. 4, 315/219, 221, 119, 127, 244

[56] References Cited

U.S. PATENT DOCUMENTS 4,234,822 11/1980 Garrison et al. ................ 315/224 X
4,240,009 12/1980 Paul ...................................... 315/224
4,392,087 7/1983 Zansky ............................ 315/225 X

*Primary Examiner*—David K. Moore

*Attorney, Agent, or Firm*—Zarley, McKee, Thomte, Voorhees & Sease

[57] ABSTRACT

A means for limiting and regulating the current of a discharge lamp. The problem is in particular making the power control of a thin fluorescent lamp easy to manage and in a universally applicable manner. The starting point chosen for the solving of this problem is a conventional supply voltage regulator, for instance one which when the luminous power is controlled clips part of the leading or trailing front of the supply voltage wave. Between such a control (1) and the lamp (8) has been connected an electronic ballast means (7) having after a filtering circuit (L,C1,C2) and a rectifier (5), a high frequency oscillator consisting of two series-connected transistors (V6, V5), a transformer (T1) connected betweem them, a choke (L1,L2) connected in series with the transformer's primary winding, and a capacitor (C6,C7) in the last-mentioned series circuit between the lamp and the current source. Moreover, between one pair of terminals of the lamp's filaments and in parallel with the lamp has been connected a capacitor (C8,C9), which during ignition determines the operating frequency and the voltage and which furthermore causes the filament heating power to increase with decreasing lamp current.

3 Claims, 4 Drawing Figures

MEANS FOR LIMITING AND CONTROLLING THE CURRENT OF A DISCHARGE LAMP

Figure 1:
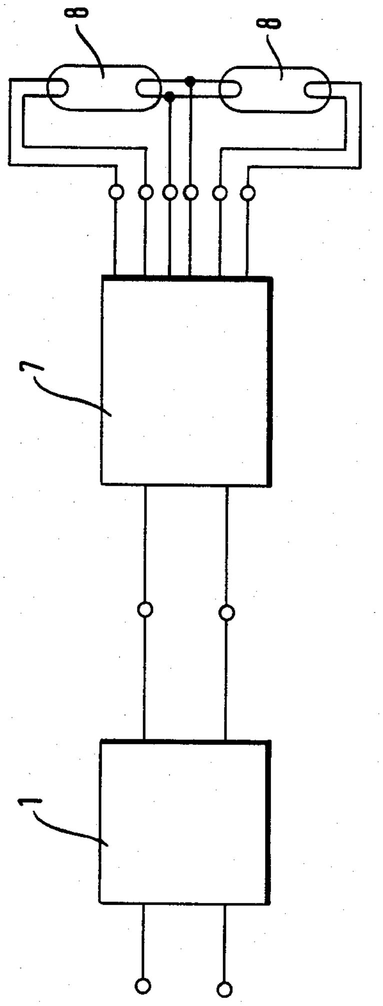

The present invention concerns a means for limiting and controlling the current of a discharge lamp, comprising a supply voltage regulator.

Various kinds of supply voltage regulators for regulating the luminous power of a lamp have long been known and commonly employed in connection with conventional coil chokes provided with an iron core. Of such conventional pieces of apparatus may be mentioned the so-called phase angle controllers, by which for regulating the luminous power part of the leading or trailing front of the supply voltage wave is clipped.

On the other hand such electronic current-limiting ballast apparatus is previously known wherein with the aid of transistors has been composed a high frequency oscillator, by which high frequency current is supplied to the lamp. It has been proposed in connection with such an electronic ballast means of prior art to control the lamp's luminous power by controlling the operation of the oscillator's transistor switches. However, to realize this kind of control special wiring or a particular remote control is required.

In fluorescent lamp applications all control methods of prior art have only been applied in the control of so-called thick (38 mm diameter) tubes, and the new so-called thin (26 mm diameter) tube has been considered exceedingly difficult, or impossible, to control.

In the present invention the realization has been made that by using a certain type of ballast means, control of the luminous power of the lamp—including that of a thin tube—can be accomplished with a conventional supply voltage control means.

By the means of the invention the following advantages, among others, are gained:

(1) Fluorescent tubes—both the thick and thin tube—can be controlled within the range of about 5% to 100%.

(2) The fluorescent tubes—both thick and thin ones—become ignited within the entire range of regulation; this has a substantial significance when the ambient light is used to control the luminous level of the lamps (so-called constant light operation).

(3) The means is applicable in the commonly employed phase angle control in a two-wire system. This implies that the separate voltage supply lead for the heater transformer, required by standard phase angle control, is not needed.

(4) It is possible to install the control system in old installations in which no control has been used before, without need to increase the number of installation leads.

(5) Compared with the conventional regulator/choke system, the capacity of the control can be made about 2.4-fold, owing to the power factor (1) of the ballast means.

(6) In an advantageous embodiment of the invention, both terminals of the heater filaments of the lamp's electrodes are connected to the oscillator's output circuit so that the heating power increases with decreasing lamp current. This has a prolonging effect on the lamp's life span.

The present invention also concerns an electronic ballast means for a discharge lamp, controllable by a supply voltage phase angle controller, with a lamp circuit comprising a high frequency generator and connected before this circuit, a D.C. voltage filtering capacitor which has been connected through a rectifier to a filtering circuit consisting of a choke and a capacitor, this filtering circuit being connected through a phase angle controller to an A.C. voltage source.

If from the circuit of a ballast means of this type the lamp is removed, or if for another reason the lamp circuit draws little electricity, then when the phase angle controller is used the voltage across the D.C. voltage filtering capacitor will rise to a dangerously high value. This is because in practice the frequency of resonance of the filtering choke 2 and capacitor 3 (cf. FIG. 3) is higher than the mains frequency, and the oscillation of this circuit together with the voltage curve shape produced by the phase angle controller (an example of the voltage curve shape shown in FIG. 4) causes a voltage increase across the capacitor 3 and at the same time in the aforementioned D.C. voltage filtering capacitor, unless the latter is sufficiently loaded. The consequence is destruction of the capacitor 6 and/or the phase angle controller due to excessive voltage.

The additional object of the invention is to enable the electronic ballast means to be controlled by the phase angle controller without incurring the risk of excessive voltage just described. This object is achieved by virtue of the characteristic features of the invention stated in the attached claims 5-10.

Figure 2:
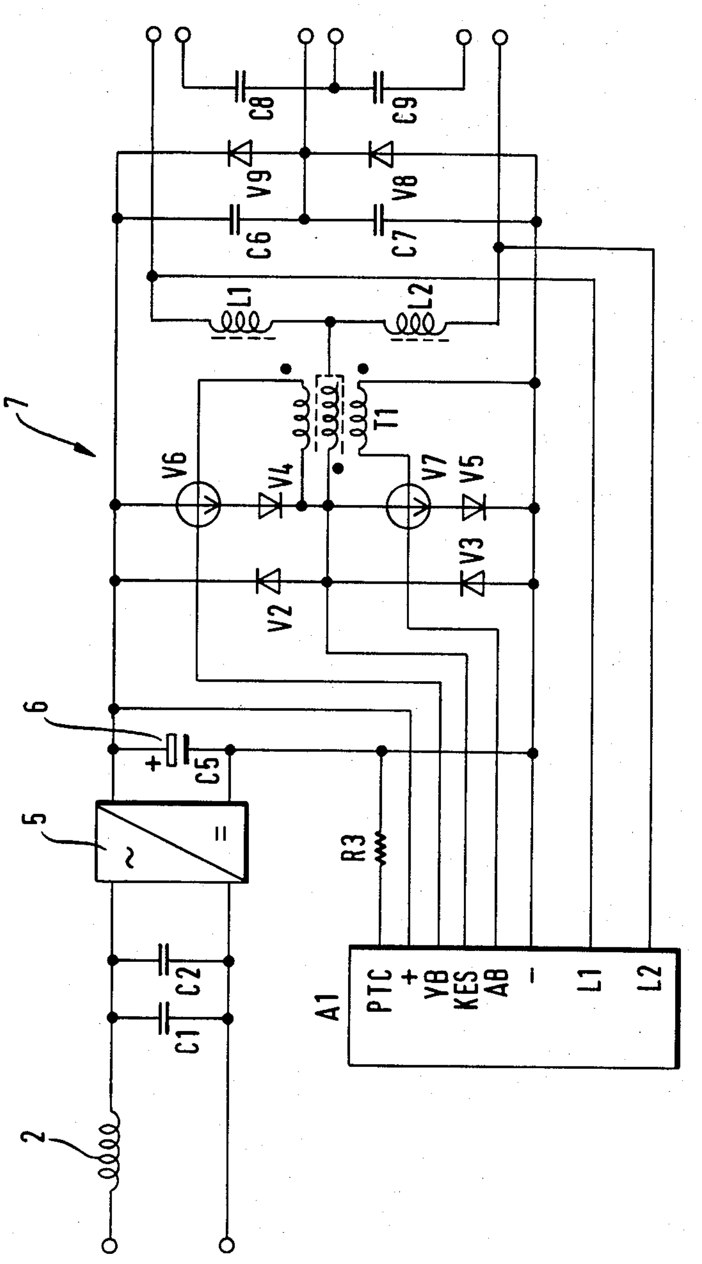

The invention is illustrated in the following by referring to the drawings attached, wherein:

FIG. 1 presents the general block diagram of the means of the invention, and FIG. 2 shows the circuit diagram of the electronic ballast means comprised in the means.

Figure 3:
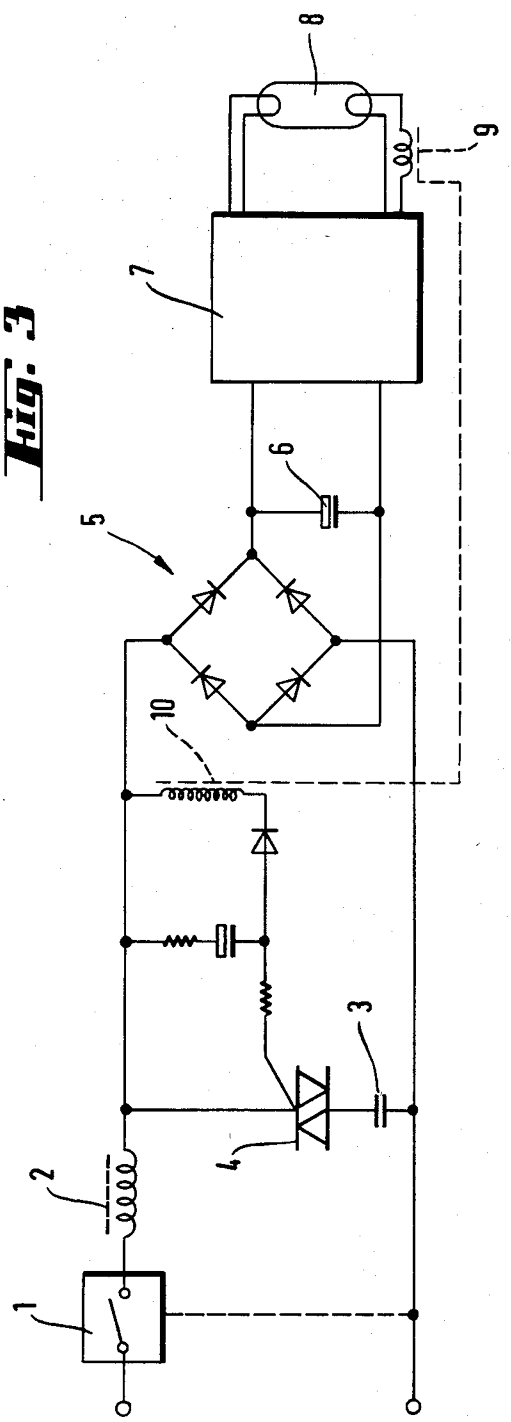
Figure 4:
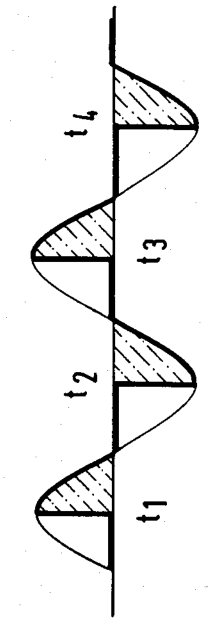

FIG. 3 presents the circuit diagram illustrating the principle of connection of the invention, and FIG. 4 shows the mains voltage described, after the phase angle controller 1 at a given control value.

With a view to controlling the luminous power of the lamp, the means of the invention comprises a conventional control 1, mounted e.g. in a door-jamb switch, which when the luminous power is being controlled clips part of the supply voltage wave from its leading or trailing front (cf. FIG. 4). Controls of this kind are known and commonly used since long and therefore their structural design shall not be described more closely here. The reference numeral 7 indicates the electronic ballast means, which is normally accommodated in the frame housing of the lighting fixture, where the discharge lamps, such as fluorescent tubes 8, are also located.

The electronic ballast means of FIG. 2 comprises a filtering circuit consisting of a series choke 2 and of capacitors C1 and C2 connected in parallel. This filtering circuit enables the use in the ballast means of the voltage with clipped wave form obtained from the control 1. After the rectifier 5 and the electrolytic capacitor 6 a D.C. voltage is obtained for the ballast means, the magnitude of this voltage depending on the setting of the control 1.

Between the D.C. poles + and − and the lamp terminals has been built up a high frequency oscillator comprising two transistors connected in series, V6 and V7, and diodes V4 and V5 connected in series with them. One terminal of the primary winding of transformer T1 has been connected to the common point of transistors V6 and V7, and the other terminal has been carried through induction coils L1 and L2 to the lamp terminals. The secondary windings of the transformer T1 have been connected to the bases of transistors V6 and V7 so that they receive opposite control voltages. Then, when one transistor is conductive the other transistor is turned off, and vice versa. One terminal of the lamp has been connected by resonance capacitors C6 and C7, and by voltage limiter diodes V9 and V8 connected across them, to the opposite poles of the current source. In addition, there has been connected between the two terminals of each lamp a capacitor C8/C9, which during ignition determines the operating frequency and the voltage. During operation, however, the capacitors C6 and C7 constitute the main resonance capacitances. The capacitors C8 and C9 connected to the other terminals of the lamp's filaments have the further significance that during operation, too, heating power is applied to the filaments, which moreover increases with decreasing lamp current. This increases the life span of the lamps.

The significance of diodes V4 and V5 lies therein that their admittance voltage reduces the common turned-on time and current of the transistors C6 and V5. The protective diodes V2 and V3 provide a flow path for the inductive current when both transistors V6 and V6 are in non-conductive state. The block A1 contains the following circuits, which are not more closely described in this connection since they can be carried out in a multitude of ways by a person skilled in the art and they are not directly associated with the present invention:

PTC is an over-voltage monitoring circuit;

YB is an operation-blocking circuit for various instances of malfunction;

AB, KES are connections for the oscillating starting circuit; and

L1, L2 are the connections of the lamp voltage monitoring circuit.

The present invention has for the first time ever disclosed a design solution wherein the known input voltage control is employed together with an electronic ballast means towards regulating the luminous power of a lamp.

After the phase angle controller 1 clipping the front of the supply voltage wave as shown in FIG. 4 has been connected a filtering circuit consisting of choke 2 and capacitor 3. The choke 2 may be totally incorporated in one input lead of the mains electricity, as shown in FIG. 2, or it may be divided partly between both leads. After the rectifier 5 has been connected a large-scale electrolytic capacitor 6 serving as filtering capacitor and supplying power to the lamp circuit, 7,8. The lamp circuit 7 comprises a high frequency generator, of which the circuit design may be as shown in FIG. 2 or as disclosed in the same applicant's earlier Finnish patent application Nos. 811774 and 812930. Other types known in the art of lamp circuits comprising a high frequency generator may also be contemplated.

A substantial feature in this embodiment is the switch connected in series with the capacitor 3—in the present in case a triac 4—which takes the capacitor 3 out of the circuit when the lamp 8 has been removed or when for any reason the lamp circuit 7,8 imposes on the capacitor 6 such a small lead that the resonant oscillator circuit constituted by the choke 2 and capacitor 3 will in phase angle controller operation raise the voltage of the circuit to a dangerously high level. In the case depicted, the triac 4 has been arranged to derive its control through a current transformer 9,10 sensing the current of the lamp 8 in such manner that when the current through the lamp 8 falls below a given value the normally conductive triac 4 becomes non-conductive. It is obvious that instead of the triac 4 any other electric switch can be contemplated—for instance a relay, thyristor plus diode, or other semiconductor or other electric switch. What is essential is that the capacitor 3 will be sufficiently detached from the circuit as soon as the capacitor 6 is no longer sufficiently loaded by the lamp circuit. It is possible to employ to this end also an artificial load applied in connection with the capacitor 3, for instance a positive temperature coefficient resistor connected in series with the capacitor 3, of which the resistance increases steeply when the current through the capacitor surpasses a predetermined value.

The switch 4 may equally be controlled in such manner that is will open (e.g. the triac 4 will become non-conductive) under control by the capacitor 6 when for one reason or another the voltage across the capacitor 6 rises to undesirable level. This embodiment also protects the supply mains against over-voltage.

Naturally, the invention is not confined to the circuit diagram of FIG. 1: it is also applicable in cases where there is, in parallel with the capacitor 3, a capacitance which is not cut out of the circuit when the capacitor 3 is disconnected.

We claim:

1. Electronic ballast means for a discharge lamp, controllable by a supply voltage phase angle controller (1), with a lamp circuit (7) comprising a high frequency generator and before this circuit being connected a D.C. voltage filtering capacitor (6) which has through a rectifier (5) been connected to a filtering circuit consisting of a choke (2) and a capacitor (3), this latter circuit being connected through a phase angle controller (1) to an A.C. voltage source, characterized in that in series with capacitor (3) of said filtering circuit has been connected a current limiting or switching-off means (4) having its control electrode connected to a sensing means (9, 10) responsive to the changes in the generator's load.

2. Ballast means according to claim 1, characterized in that said current limiting or switching-off means is an electronic switch (4).

3. Ballast means according to claim 2, characterized in that the electronic switch is a triac (4) having its control electrode connected to a current transformer (9, 10), which is connected to the generator's output circuit.

* * * * *